United States Patent
Loubet Moundi et al.

(10) Patent No.: US 12,333,056 B2
(45) Date of Patent: Jun. 17, 2025

(54) NEURAL NETWORK CRYPTOGRAPHY COPROCESSOR PROVIDING COUNTERMEASTURE AGAINST SIDE-CHANNEL ANALYSIS

(71) Applicant: THALES DIS FRANCE SAS, Meudon (FR)

(72) Inventors: Philippe Loubet Moundi, La Ciotat (FR); Eric Bourbao, Le Beausset (FR); Eric Claise, Le Castellet (FR)

(73) Assignee: THALES DIS FRANCE SAS, Meudon (FR)

( * ) Notice: Subject to any disclaimer, the term of this patent is extended or adjusted under 35 U.S.C. 154(b) by 244 days.

(21) Appl. No.: 18/039,756

(22) PCT Filed: Dec. 9, 2021

(86) PCT No.: PCT/EP2021/085094
§ 371 (c)(1),
(2) Date: Jun. 1, 2023

(87) PCT Pub. No.: WO2022/122977
PCT Pub. Date: Jun. 16, 2022

(65) Prior Publication Data
US 2024/0095410 A1 Mar. 21, 2024

(30) Foreign Application Priority Data
Dec. 9, 2020 (EP) .................................. 20306522

(51) Int. Cl.
*G06F 21/75* (2013.01)
*G06F 21/60* (2013.01)

(52) U.S. Cl.
CPC .......... *G06F 21/755* (2017.08); *G06F 21/602* (2013.01)

(58) Field of Classification Search
None
See application file for complete search history.

(56) References Cited

U.S. PATENT DOCUMENTS 11,503,061 B1 * 11/2022 Lin .......................... G06N 5/04
11,698,977 B1 * 7/2023 Mixon-Baca ......... G06F 21/566
726/25

(Continued)

FOREIGN PATENT DOCUMENTS

| CN | 103646219 A1 | 3/2014 |
|---|---|---|
| EP | 3534253 A1 | 9/2019 |

OTHER PUBLICATIONS

International Search Report (PCT/ISA/220) and Written Opinion (PCT/ISA/237) mailed on Mar. 15, 2022, by the European Patent Office as the International Searching Authority for current International Application No. PCT/EP2021/085094—[16 pages].

(Continued)

*Primary Examiner* — Trang T Doan (57) ABSTRACT

Provided is a method for securing a security device against side-channel analysis attacks while performing a sensitive operation. It includes training an attack neural network to perform a side-channel attack against the security device while performing a sensitive operation, creating a training data set for a protective neural network by applying a plurality of elementary protection combinations to the sensitive operation while performing the sensitive operation, training a protective neural network executing on a coprocessor of the security device using the training data set for the protective neural network, and programming the coprocessor of the security device with the set of parameters for the protective neural network. Other embodiments disclosed.

8 Claims, 9 Drawing Sheets

(56) References Cited

U.S. PATENT DOCUMENTS

| | | | |
|---|---|---|---|
| 11,750,634 B1* | 9/2023 | Chowdhary | H04L 63/1416 726/25 |
| 2011/0231320 A1* | 9/2011 | Irving | G06Q 30/08 713/300 |
| 2017/0033923 A1* | 2/2017 | Melzani | G06F 7/588 |
| 2017/0286682 A1* | 10/2017 | Stappert | G06F 21/566 |
| 2020/0210583 A1* | 7/2020 | Anati | G06F 21/629 |
| 2022/0261661 A1* | 8/2022 | Khaligh | G06Q 10/0631 |

OTHER PUBLICATIONS

XP081768714—Ruizhe Gu et al.—Sep. 22, 2020 abstract p. 3-p. 13 Relevant to claim 1-14.

* cited by examiner

NEURAL NETWORK CRYPTOGRAPHY COPROCESSOR PROVIDING COUNTERMEASTURE AGAINST SIDE-CHANNEL ANALYSIS

BACKGROUND

The present invention relates generally to electronic cryptography technology, and in particular to protecting a security device against side-channel attacks.

Electronic communication and commerce can be powerful yet dangerous tools. With the wide-spread availability of network technology, such as the Internet, there is an ever-increasing use of online tools for communication and commerce. Every year more users find it easier or quicker to conduct important transactions, whether in the form of correspondence or commerce, using computers and computer networks. However, there is always the risk that the security of electronic transactions is compromised through interception by third parties who do not have the right to partake in the transactions. When malicious third parties obtain access to otherwise private transactions and data there is risk of economic loss, privacy loss, and even loss of physical safety. Cryptography is one mechanism employed to avoid intrusion into the privacy of electronic transactions and data.

Cryptography is a technology for hiding a message in the presence of third parties using mathematical techniques in which a message is encrypted in such a way that it can only be decrypted using a secret key that should only be known by the recipient and/or sender of a message.

Cryptographic algorithms have inputs and outputs. In the case of encryption, the input is a message that is to be protected in plaintext. The plaintext message is manipulated by the cryptographic algorithm to produce a ciphertext, the output. To produce the ciphertext the cryptographic algorithm performs certain mathematical operations that include the use of a secret key. The key may be a shared secret, e.g., between a sender and recipient, or may be a private key held by the recipient.

Traditionally, both sender and recipient of a cryptographic message were considered secure. Cryptography's primary use was to transmit an encoded message from the sender to the recipient without fear that an intermediary would be able to decode the message. If an attacker has no access to the sender's or recipient's cryptographic devices, the attacker is limited to using the encoded message itself or possibly an encoded message and a corresponding plaintext message, to discern the cryptographic key used to encode or decode the message. However, if the attacker has access to the cryptographic device, the picture changes dramatically.

One mechanism of ensuring that a private key is indeed kept private is to store the private key and any related key material on a secure portable device, e.g., a smart card or a mobile device. A smart card is a small tamper resistant computer often in the form of a credit card sized and shaped package. Smart cards may be used to store cryptographic keys and cryptography engines for performing encryption, decryption, and digital signatures.

In one example, a user may receive an encrypted message and uses his smart card to decrypt the message by first authenticating to the smart card and then passing the message to the smart card for decryption. If authentication is successful, the smart card may use a cryptographic key stored on the card, and a corresponding cryptography engine, to decrypt the message and provide the decrypted message to the user. Similarly, if a user wishes to cryptographically sign a message, the user may pass the message to the user's smart card, which uses a cryptographic key of the user to digitally sign the message and to provide the signature back to the user or to a third-party recipient.

If an attacker has access to the smart card, the attacker may make repeated observations of, for example, power consumption or electromagnetic emission, during the execution of the cryptographic algorithms and use such ancillary information in attempts to discern the secrets stored on the smart card, specifically secret cryptographic keys stored on the smart card. One such attack is the so-called side-channel attack.

Side-channel attacks make use of the program timing, power consumption and/or the electronic emanation of a device that performs a cryptographic computation. The behavior of the device (timing, power consumption and electronic emanation) varies and depends directly on the program and on the data manipulated in the cryptographic algorithm. An attacker could take advantage of these variations to infer sensitive data leading to the recovery of a private key.

In parallel to the development of side-channel analysis attacks, techniques have been developed to protect against attempts to recover keys, or other sensitive information, from side-channel leakages. These techniques, known as countermeasures, include attempts to hide the operations of the cryptography device from any side-channel data leakage, for example, by masking the data while being manipulated by cryptographic algorithms, by introducing dummy instructions, altering order of instructions, or manipulating the system clock to introduce jitters in any collected side-channel data.

There are several different types of side-channel attacks and, conversely, several different types of countermeasures. With respect to side-channel attacks based on electrical activity of a device, Mark Randolph and William Diehl, *Power Side-Channel Attack Analysis: A Review of 20 Years of Study for the Layman*, Cryptography 2020, 4, 15; doi: 10.3390/cryptography4020015 (incorporated herein by reference) provides a survey of many of the techniques employed as well as discussion of countermeasures.

As countermeasures have become more powerful, side-channel analysis attacks have also become sophisticated in negating the effect of the countermeasures to allow for detection of sensitive information through side-channel leakages even when countermeasures are being applied. For example, Cagli et al. describe the use of convolutional neural networks for side-channel analysis and demonstrate that such a technique may defeat jitter-based countermeasures. Cagli, E. et al., *Convolutional Neural Networks with Data Augmentation Against Jitter-Based Countermeasures*. CHES 2017, LNCS10529, pp. 45-68, 2017.

It should be noted that the vulnerability to side-channel analysis is not limited to cryptography operations. There are many other operations by computers that must protect sensitive information, for example, passwords. Thus, side-channel analysis is an issue in such scenarios also.

From the foregoing it is apparent that there is a need for an improved countermeasure technique to protect against sophisticated side-channel analysis attacks, for example, those based on learning techniques using convolutional neural networks.

SUMMARY

For this purpose and according to a first aspect, this invention therefore relates to a method for securing a security device against side-channel analysis attacks while performing a sensitive operation, the method comprising:

training an attack neural network to perform a side-channel attack against the security device while performing a sensitive operation;

creating a training data set for a protective neural network by applying a plurality of elementary protection combinations to the sensitive operation while performing the sensitive operation using a plurality of values for the piece of sensitive information, and for each elementary protection combination and sensitive information value, recording in the training data set whether the elementary protection combination prevented the attack neural network from discerning the sensitive information value;

training a protective neural network executing on a coprocessor of the security device using the training data set for the protective neural network such that an input to the protective neural network is a sensitive information value to be protected and an output of the protective neural network is an indicator of which combination of elementary protections to apply to protect the piece of information from being detectable using the attack neural network thereby producing a set of parameters for the protective neural network; and programming the coprocessor of the security device with the set of parameters for the protective neural network.

The step of training an attack neural network may comprise: collecting side-channel data traces while performing the sensitive operation on the security device using a large set of values for the sensitive information value used to perform the sensitive operation wherein for a given input side-channel data trace the attack neural network produces a predicted value for the sensitive information.

The step of creating a training data set for the protective neural network may comprise:

collecting side-channel data traces while performing the sensitive operation on the security device using a large set of values for the piece of sensitive information used to perform the sensitive operation;

applying the attack neural network to the collected side-channel data traces and recording for each collected data trace, whether the attack neural network successfully determined the sensitive information value associated with the data trace thereby producing a training data set with a record, for each combination of sensitive information value and elementary-protection combination, whether the elementary-protection combination successfully protected the sensitive information value from being determined by the attack neural network.

The step of programming the coprocessor of the security device may comprise: storing the set of parameters in a memory connected to the coprocessor.

The piece of sensitive information may be a cryptographic key.

The sensitive operation may be either a cryptographic operation selected from a set comprising encryption, decryption, digital signature, and authentication or an operation selected from a set comprising memory transfer of sensitive data, biometric data manipulations, PIN code or password operations.

The combination of elementary protections may comprise one or more elementary protections selected from software countermeasures comprising random interrupt, random memory cache flushing, random delay, dummy process, randomized execution order, masking with a random value, and hardware countermeasures comprising random interrupt, random memory cache flushing, activation of complementary computation, random delay, dummy clock cycle, power random noise insertion, power smoothing, jittering, clock randomization, bus encryption, randomized execution order, masking with a random value.

According to a second aspect, this invention therefore relates also to a system for programming a security device having a co-processor operable to execute a neural network, the system comprising:

a computer connected to a device operable to produce side-channel data traces from an operation of a security device, the computer being programmed with instructions to:

train an attack neural network to perform a side-channel attack against the security device while performing a sensitive operation;

create a training data set for a protective neural network by applying a plurality of elementary protection combinations to the sensitive operation while performing the sensitive operation using a plurality of values for the piece of sensitive information and for each elementary protection combination and sensitive information value, recording in the training data set whether the elementary protection combination prevented the attack neural network from discerning the sensitive information value;

train a protective neural network executing on the coprocessor of the security device using the training data set for the protective neural network such that an input to the protective neural network is a sensitive information value to be protected and an output of the protective neural network is an indicator of which combination of elementary protections to apply to protect the piece of information from being detectable using the attack neural network thereby producing a set of parameters for the protective neural network; and program the coprocessor of the security device with the set of parameters for the protective neural network.

According to a third aspect, this invention therefore relates also to a security device protected against side-channel analysis attacks, comprising:

a processor adapted to perform a sensitive operation involving a piece of sensitive information, wherein the sensitive operation accepts an input on which to execute the sensitive operation and is configured to execute a plurality of elementary counter measures; and a neural network co-processor adapted to execute a neural network accepting the sensitive information value as input and adapted to determine a set of elementary counter measures to apply in response to the sensitive information value;

a plurality of elementary protection modules, wherein each elementary protection module of the plurality of elementary protection modules is configured to provide an elementary protection against side-channel analysis.

In a first embodiment, at least one of the elementary protection modules may be a hardware module of the security device.

In a second embodiment, at least one of the elementary protection modules may be a software module stored in a memory connected to the processor and comprising instructions executable by the processor.

The security device according to the third aspect may comprise a memory connected to the processor, the memory including instructions executable by the processor to cause the processor to execute a sensitive operation selected from a set of cryptography operations including encryption, decryption, digital signing, digital authentication.

The elementary protection modules may be software modules stored in a memory connected to the processor.

The elementary protection modules may be selected from modules implementing side-channel analysis countermeasures selected from jittering, clock randomization, bus encryption, masking with a random value, randomized execution order, random interrupt, random memory cache flushing, activation of complementary computation, random delay, dummy clock cycle, dummy process, power random noise insertion, power smoothing.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The following description includes references to various methods executed by a processor of an integrated circuit chip. As is common in the field, there may be phrases herein that indicate these methods or method steps are performed by software instructions or software modules. As a person skilled in the art knows, such descriptions should be taken to mean that a processor, in fact, executes the methods, software instructions, and software modules.

The herein described technology provides a mechanism for using a coprocessor adapted to select a countermeasure or combination of countermeasures from a set of available countermeasures based on the value of a piece of sensitive information being protected by a security device while it performs a sensitive operation. A sensitive operation is an operation that processes or uses a piece of sensitive information that should be protected from being divulged. Examples of sensitive information include private cryptographic keys, account numbers, PIN codes and passwords, biometric information, as well as data transferred in secure memory transfer operations. Cryptography operations are typically sensitive operations. Account access through account number, PIN or password are also sensitive operations as are operations to access or manipulate biometric information.

Figure 1:
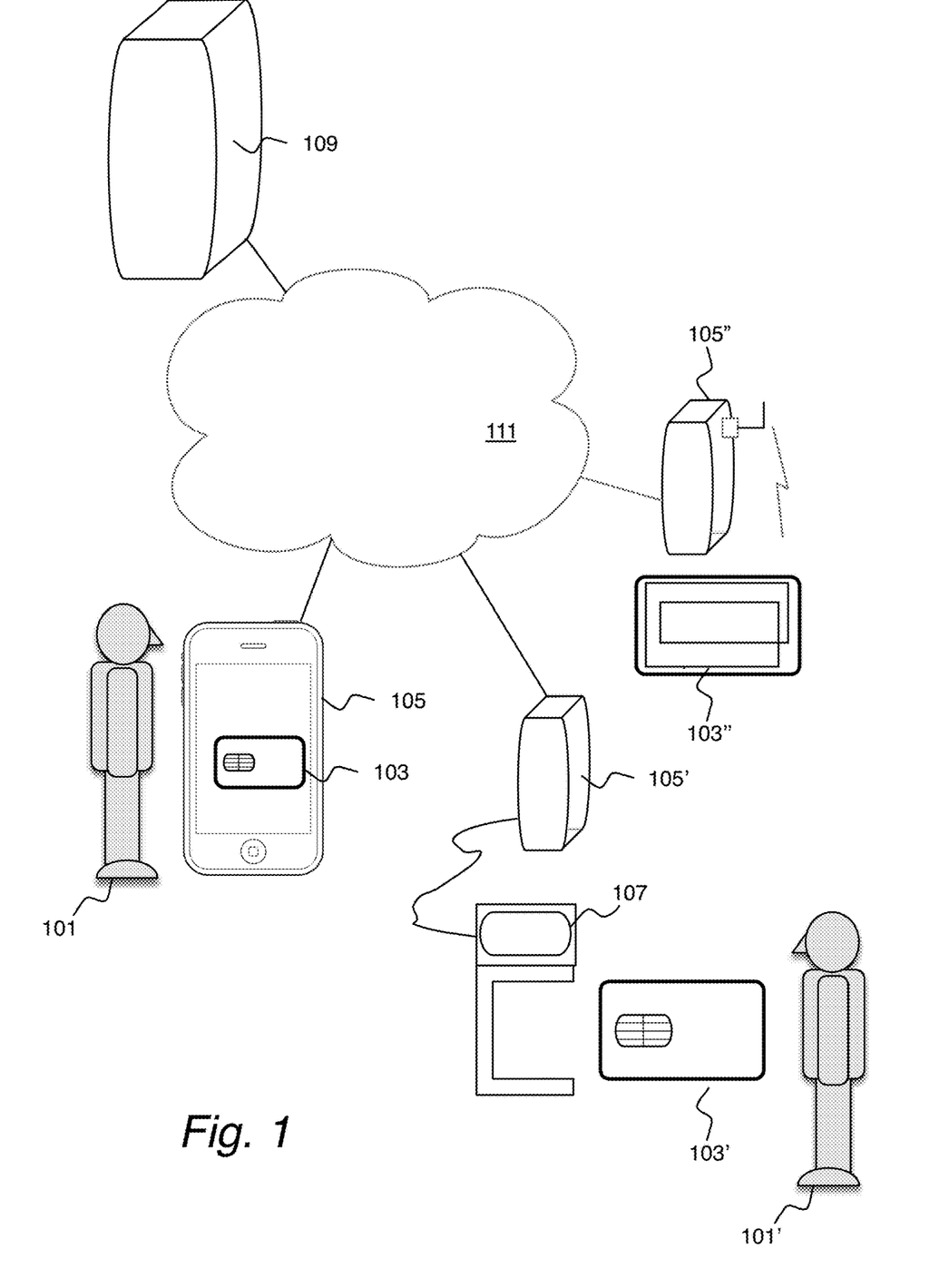
FIG. 1 is an illustration of a network in which users operate security devices to perform any of a variety of sensitive operations.

FIG. 1 is an illustration of a network 111 in which users 101 operate security devices 103 to perform any of a variety of sensitive operations, for example, cryptographic operations. The security devices 103 may be any of various types of tamper resistant devices such as smart cards, electronic identity cards, passports, and secure USB tokens. A security device 103 may be installed in a host device 105, such as a mobile communications device. Alternatively, a security device 103' may be connected via a terminal 107 to a host device 105'. In yet another alternative, a security device 103" may be wirelessly connected to a host device 105", for example, via near-field communication (NFC), Bluetooth, or WiFi.

In many cases, the security devices 103 are used to perform cryptographic services in conjunction with a service provided by a service provider 109 over a network 111, e.g., the Internet. Such cryptographic services include providing cryptographic signature, encryption, decryption, and authentication. Alternatively, the security devices are used for other operations that involve sensitive information, for example, account access via PIN, password or biometrics.

To perform sensitive operations, for example, cryptographic operations, the security device 103 store some sensitive information thereon, e.g., cryptographic keys, PINs or passwords.

As may be noted by the examples of FIG. 1, security devices 103 may be mobile devices that are somewhat prone being lost or stolen and can thus come into possession by a person who may desire to discern the sensitive information stored on the security device 103.

In classical cryptography, a sender and recipient of a secret message are each in possession of keys that may be employed to encrypt the message and decrypt the message, respectively. The security of the employed cryptographic algorithm relies on confidence that it is mathematically very difficult to decipher the message without the correct key as well as mathematically very difficult to determine the encryption and decryption keys from a message. Thus, if a message is intercepted en route to a recipient, the intercepting party would not be able to infer either the associated plaintext or the keys used to encrypt and decrypt the message.

That security relies on an assumption that the execution of the algorithm itself will not provide information that may be used to determine the sensitive information used in performing the sensitive operation, e.g., a decryption operation. If the message is intercepted between sender and intended recipient, that is a safe assumption in the intercepting entity would not have access to the device that is being used to decipher the message.

However, as may be noted by the examples of FIG. 1, security devices 103, e.g., cryptographic devices, may be mobile devices that are somewhat prone being lost or stolen and can thus come into possession by a person who may desire to discern the sensitive information stored on the security device 103. In such instances, an entity seeking to determine the sensitive information stored on the security device 103 may, in fact, be in possession of the security device 103 and may therefore be able to observe the security device while it is executing sensitive operations, for example, cryptographic operations.

When a security device 103 may be observed while performing sensitive operations, it is possible to measure various physical characteristics of the security device 103 that change during the performance of the sensitive operation. For example, the power consumption, electromagnetic radiation, timing information, and even noise of the security device 103 may be recorded and analyzed to determine the sensitive information stored on the security device 103. Collectively, such physical characteristics are referred to herein as side-channel data and use of such data to determine a sensitive information, e.g., a cryptographic key, as side-channel analysis.

In one form of side-channel analysis, referred to as supervised attack or profiling attack, the attacker may manipulate the sensitive information on a security device 103 that the attacker controls (such a device is referred to as a device under test or DUT) while monitoring a side-channel data produced by the DUT while it performs a sensitive operation. The produced data may be used to create templates that may be used while analyzing a security device being attacked, i.e., a device from which the attacker seeks to discern sensitive information stored on the security device. The latter security device is referred to herein as the device under attack. And as discussed in greater detail below, the monitored side-channel data may also be used to train a deep-learning neural network that may be used against a device under attack.

Figure 2:
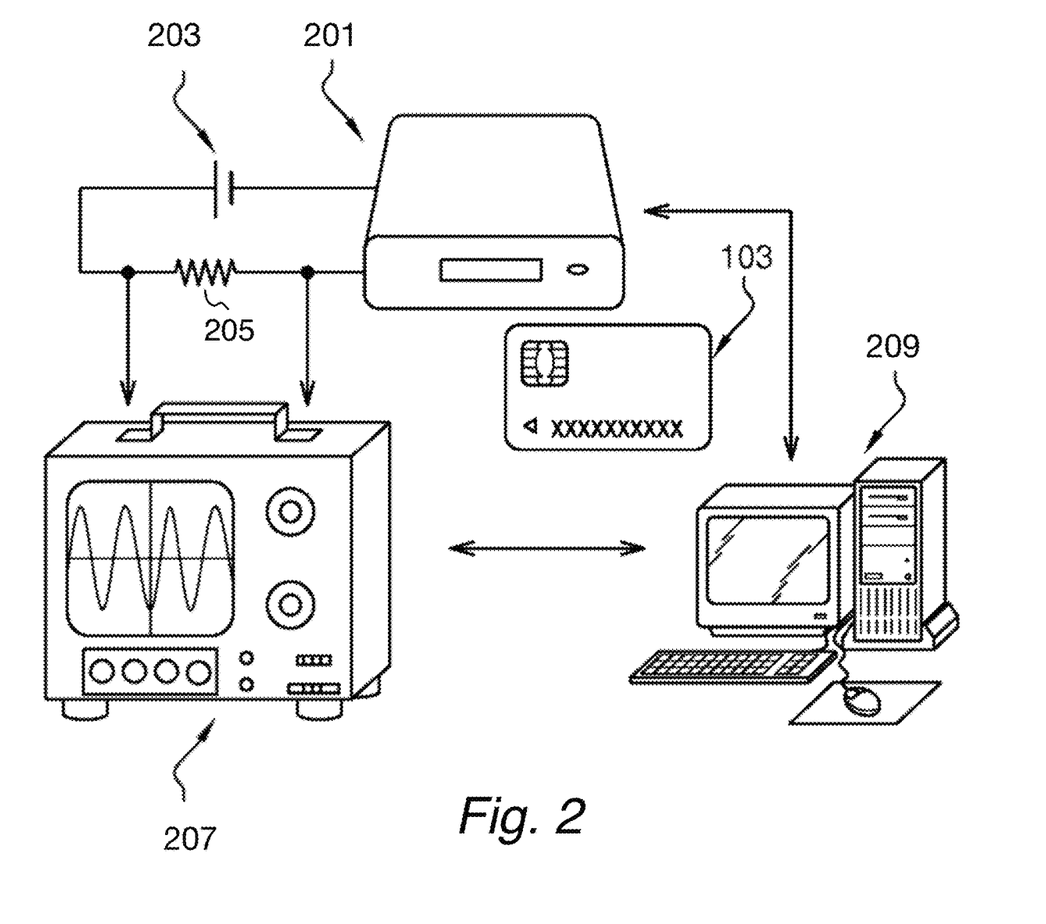
FIG. 2 is an illustration of equipment that may be used to perform a side-channel analysis.

FIG. 2 is an illustration of equipment that may be used to perform a side-channel analysis. A security device 103 may be inserted into a reader 201. The reader is either connected to or contains an electronic circuit having, for example, a power source 203 that provides power to the security device and a resistor 205. Power consumption of the security device 103 may be monitored on a signal acquisition device 207, for example, an oscilloscope, connected in parallel to the resistor 205. A computer 209 is also connected to the reader 201. The computer 209 may be used to change the sensitive information stored on a device under test, i.e., a device that may be manipulated by the attacker, induce the security device 103 to perform sensitive operations, e.g., decryption, digital signature, or authentication. The signal acquisition device 207 may also be connected to the computer 209 so that digitized power traces produced by the signal acquisition device 207 may be transferred to the computer 209 for analysis.

The setup of FIG. 2 may also be used to attack a device under attack.

There are many different types of side-channel attacks. These include, but are not limited to, Simple Power Analysis (SPA), Differential Power Analysis (DPA), Template Attacks (TA), Correlation Power Analysis (CPA), Mutual Information Analysis (MIA), and Test Vector Leakage Assessment (TVLA). Mark Randolph and William Diehl, *Power Side-Channel Attack Analysis: A Review of* 20 *Years of Study for the Layman, Cryptography* 2020, 4, 15; doi:10.3390/cryptography4020015. Randolph and Diehl provide a good introduction to the subject of side-channel analysis.

There are many techniques available to defend against side-channel analysis attacks. The countermeasures include both software techniques, for example, manipulation of the order of calculations, random introduction of dummy instructions that do not affect the final computation into the executed algorithms, and masking of data, and hardware techniques, for example, clock jittering, clock randomization, random process interrupts, bus encryption.

It has been determined that convolutional neural networks have the ability to overcome both software and hardware countermeasures. Cagli, E., Dumas, C., and Prouff, E., *Convolutional Neural Networks with Data Augmentation Against Jitter-Based Countermeasure, Profiling Attacks Without Pre-Processing, CHES* 2017, W. Fisher and N. Homma (Eds.), pp. 45-68, 2017.

Figure 3:
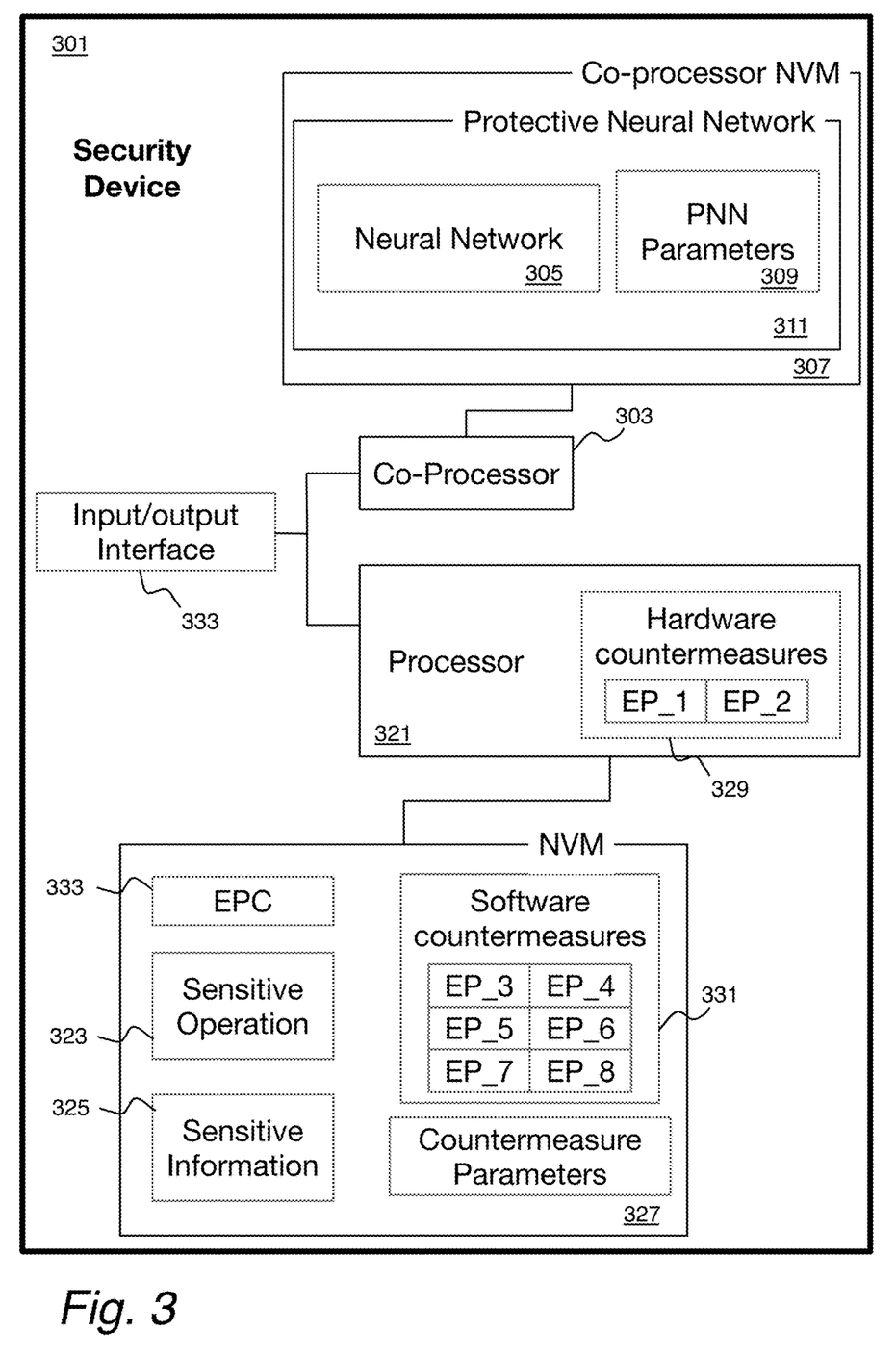
FIG. 3 is a hardware diagram illustrating a security device that has a processor for carrying out a sensitive operation, e.g., a sensitive operation such as decryption, digital signature, authentication, or encryption, using a piece of sensitive information, e.g., a cryptographic key or other sensitive operation.

FIG. 3 is a hardware diagram illustrating a security device 301 that has a processor 321 for carrying out a sensitive operation 323, e.g., a cryptographic operation such as decryption, digital signature, authentication, or encryption, using a piece of sensitive information 325, e.g., a cryptographic key. The sensitive operation 323, which may be software code executable by the processor 321, and piece of sensitive information 325 may be stored in a non-volatile memory 327 connected to the processor 321.

The processor 321 is further equipped with one or more countermeasure modules, EP_1 through EP_8, that are designed to defend against side-channel analysis attacks. Details of such countermeasures are known in the art and is outside of the scope of this disclosure. The techniques presented herein are applicable to any countermeasure that may be executable by the processor 321.

The countermeasures may be implemented as hardware countermeasures 329, for example, implemented in the firmware of the processor 321 or as software countermeasures 331, implemented as software code executable by the processor 321 and stored in the non-volatile memory 327. Such software countermeasures may comprise random interrupt, random memory cache flushing, random delay, dummy process, randomized execution order, masking with a random value, and such hardware countermeasures may comprise random interrupt, random memory cache flushing, activation of complementary computation, random delay, dummy clock cycle, power random noise insertion, power smoothing, jittering, clock randomization, bus encryption, randomized execution order, masking with a random value.

Each of these countermeasure modules are referred to herein as elementary protections and are each given an index. For example, EP_1 may be clock jittering and EP_7 may be data masking. The various elementary protections may be variations of a particular kind countermeasure technique. For example, EP_1 may be clock jittering by a first amount and EP_2 may be clock jittering by a second amount. Similarly, EP_7 may be data masking of a first portion of a key and EP_8 may be data masking of a second portion of the same key. Consequently, in an embodiment, there may be many more than just eight elementary protections.

The security device 301 further has a neural-network co-processor 303 for executing a neural network 305, e.g., a convolutional neural network, trained to select a combination of elementary protection counter measures based on the sensitive information protected by the security device 301.

There are many good references on neural networks, for example, Cagli et al., supra, provide a good discussion of convolutional neural networks in the context of side-channel analysis. The neural network 305 may be implemented, as illustrated in FIG. 3, as a software program stored in a non-volatile memory 307 connected to the co-processor 303. Alternatively, the neural network is implemented as a hardware module of the neural network co-processor 303 or in the firmware of the neural-network co-processor 303.

It should be noted that the arrangement of FIG. 3 is merely an illustrative example. For example, the main processor NVM 327 and co-processor NVM 307 are not necessarily separate units; they may be combined into one shared NVM. Similarly, the various units of the security device 301 may be connected to a common bus.

Training of a neural network 305 is a process of accepting input training data to determine values for weights and other parameters that control the behavior of the neural network. These weights and parameters may be stored in the NVM 307. As is discussed hereinbelow, in an embodiment, the neural network parameters are adapted to cause the neural network 305 to protect the security device 301 against side-channel analysis attacks, in particular, deep-learning neural network side-channel attacks. Thus, the combination of the parameters 309 and the neural network 305 may be considered as a protective neural network (PNN) 311.

The security device 301 may further include an input/output interface 333 connected to the co-processor 303 and the processor 321. In the case of the processor 321, the input/output interface 333 receives instruction to execute a sensitive operation 323 or instructions to update the sensitive information 325, for example, and may be used to transmit results of these operations, e.g., to a host device 105 or a remote server 109.

In the case of the co-processor 303, the input/output interface 333, in a configuration phase, may be used to program the PNN parameters 309 and may also be used to transmit an update of the sensitive information 325. The updated sensitive information 325 is then used by the co-processor 303 to execute the neural network 305 to determine which countermeasures to execute on the processor 321 to protect the sensitive operation 323 against side-channel analysis attacks. A flag vector 335, *Elementary Protection Combination (EPC)*, contains a bit for each elementary protection to indicate whether a given elementary protection should be used or not.

Figure 4:
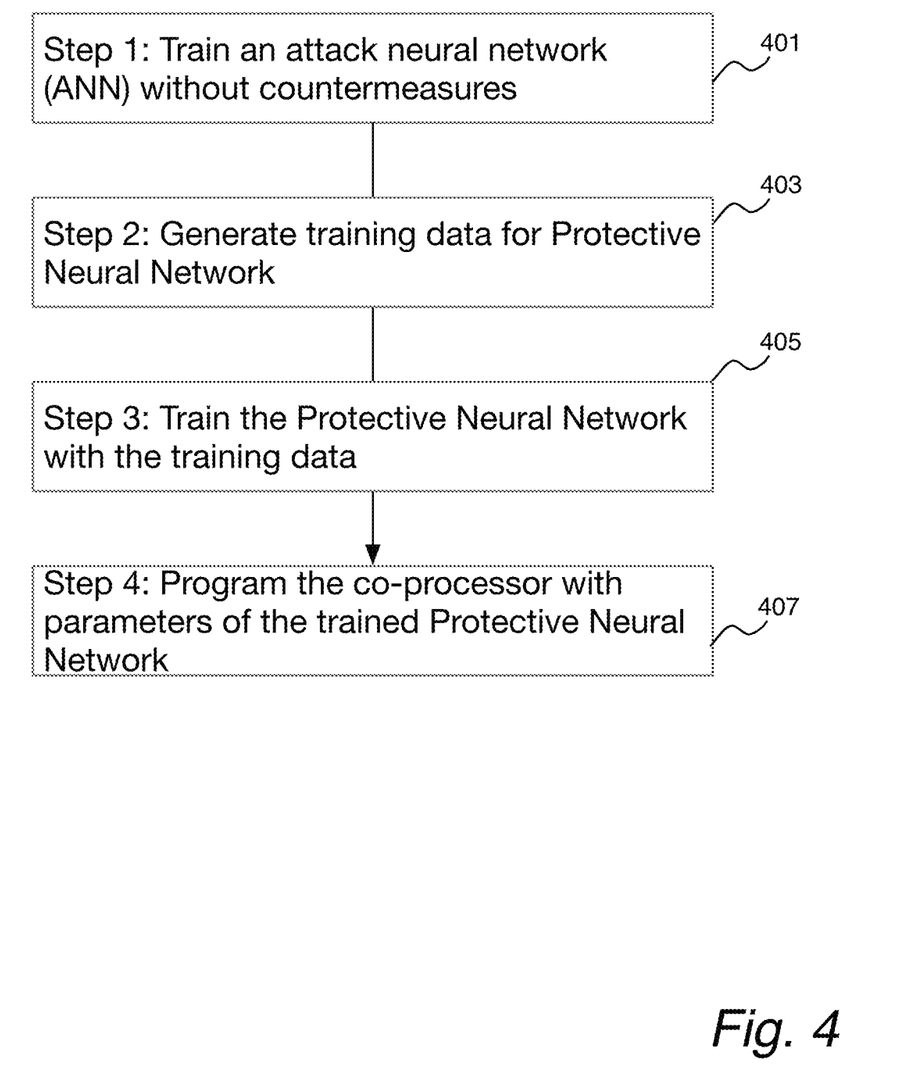
FIG. 4 is a flowchart illustrating the steps of training the protective neural network of FIG. 3.

FIG. 4 is a flowchart illustrating the steps of training the protective neural network 311. As an overview, an attack neural network is created. Training data for a protective neural network is generated by executing that attack neural network while applying various elementary protection combinations. The results from such application of elementary protections is then used to train the protective neural network.

As an overview, in an embodiment the co-processor 303 is programmed with PNN parameters 309 by creating an attack neural network and applying a variety data and elementary protections EP_n in defense against side-channel attacks based on the attack neural network. That data set is then used to train the protective neural network 311, i.e., parameters 309 for the protective neural network 311 are produced. Finally, the parameters 309 are loaded into the co-processor NVM 307.

Step One 401: An attack neural network is trained without application of countermeasures. Step One 401 is illustrated in greater detail in FIG. 5. The output of Step One 401 are parameters for an attack neural network which may be executed system 209 of FIG. 2.

Step Two 403: A training data set for a protective neural network is generated. Step Two 403 is illustrated in greater detail in FIG. 8. The output of Step Two 403 is a data set that classifies input data, e.g., different values for the sensitive information, and applied elementary protection combinations to relative success of the applied elementary protection in protecting against the side-channel analysis of the attack neural network is thus produced.

Step Three 405: The protective neural network is trained using the training data produced in step 2. The output of Step Three 405 are parameters 309 for the protective neural network 311.

Step Four 407: The parameters from Step Three are loaded onto the co-processor 303, e.g., by storing in the co-processor NVM 307.

Figure 5:
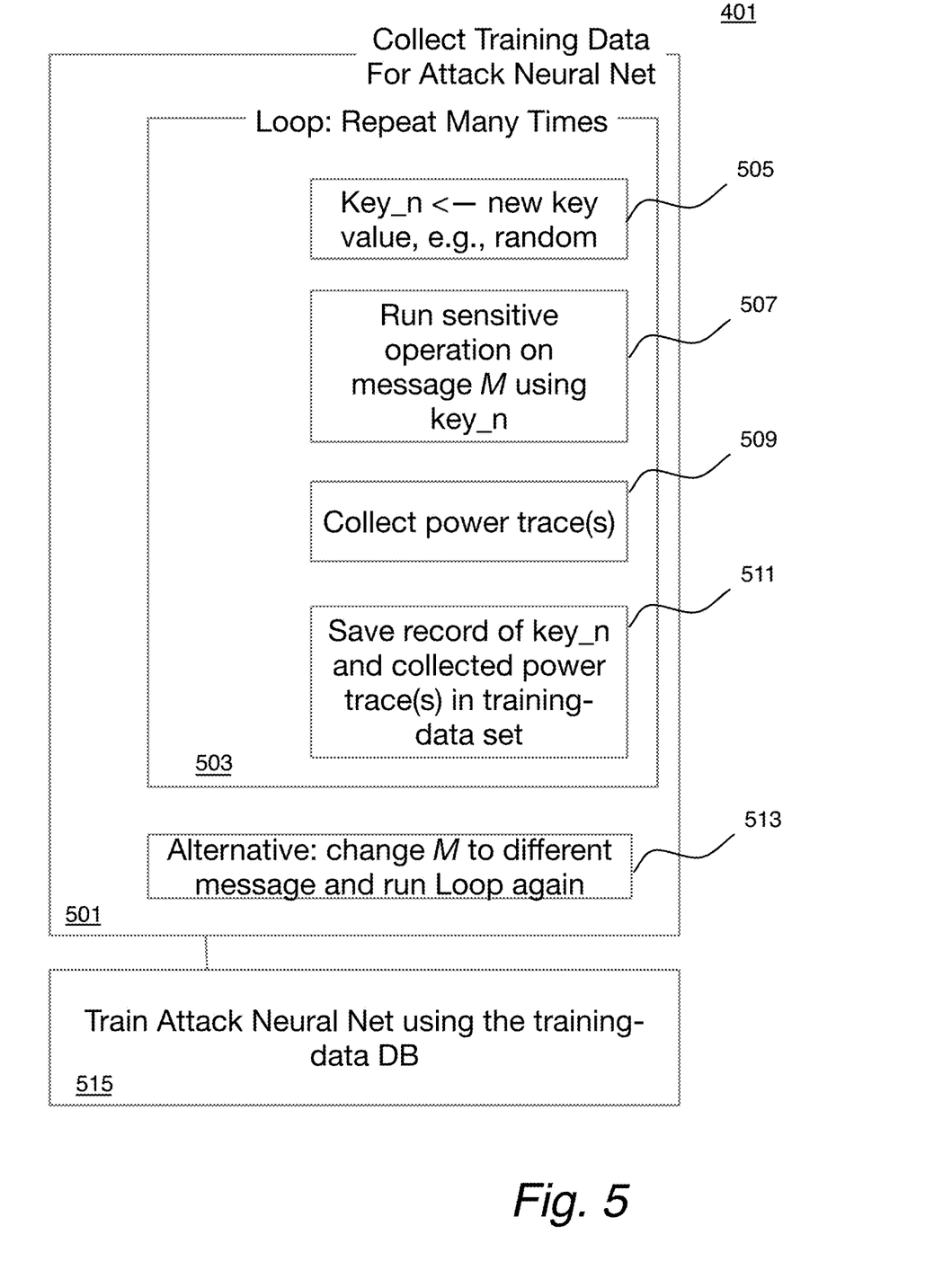
FIG. 5 is a flowchart illustrating the steps of producing an attack neural network that can be used to produce training data for the protective neural network.

FIG. 5 is a flowchart illustrating the steps of producing an attack neural network that can be used to produce training data for the protective neural network 311. A successful neural network has parameters set such that for a given input, the provided output has a high probability of being correct. Thus, training of the neural network is an exercise in adjusting parameters of the neural network based on a training data set so that when the neural network is provided an input, the output provided meets that stated goal. For the training to work well, a large number of data points should be provided.

Accordingly, the Step One 401, depicted in FIG. 5, includes a data collection phase 501. In an embodiment, the training set may have many different values of the sensitive information provided to a device under test, as a security device 103 in the apparatus of FIG. 2. As noted, a device under test is a security device 103 that an attacker may control. As such, the attacker may supply the device-under-test 103 with a multitude of values for the piece of sensitive information protected by the security device 103. This may be viewed as being a quantity that changes value over a loop 503. Thus, for each turn of the loop 503, the value for the piece of sensitive information, e.g., key value, is set to a new value, step 505. In an embodiment, to produce a training data with many different input values for the piece of sensitive information, e.g., cryptography key value, for each loop the value may be set to a random value.

Next the sensitive operation being attacked is executed on the device-under-test 103, step 507, and the side-channel data, e.g., power consumption, is observed on the signal acquisition device 207 which may be a digital oscilloscope. This produces at least one data trace of the side-channel data that is observed, which is collected by the monitoring computer 209, step 509.

The collected data trace(s) is then saved in a training data set, step 511, i.e., for each value of the piece of sensitive information, one or more data traces of the observed side-channel data is stored.

Typically in a cryptographic operation, the key value is used to perform some operation on another data item, e.g., a message, i.e., the key K may be used to decrypt the message M or it may be used to sign the message M. In an alternative embodiment, to produce a more varied data set, the message value is also altered, step 513, and the loop 503 may be repeated for multiple value of messages. This may be done either as depicted in FIG. 5 or in some other sequence, e.g, by using many message values inside the loop 503 for each key Key_n.

Using the collected training data, the attack neural network is trained using a neural network training algorithm, step 515. Neural network training algorithms are described in R. Benadjila, E. Prouff_, R. Strullu, E. Cagli, C. Dumas, Study of deep learning techniques for side-channel analysis and introduction to ascad database (2018). In summary, training of a neural network is generally an iterative process to determine the weight of each neuron that makes up the neural network to minimize a cost function.

Figure 6:
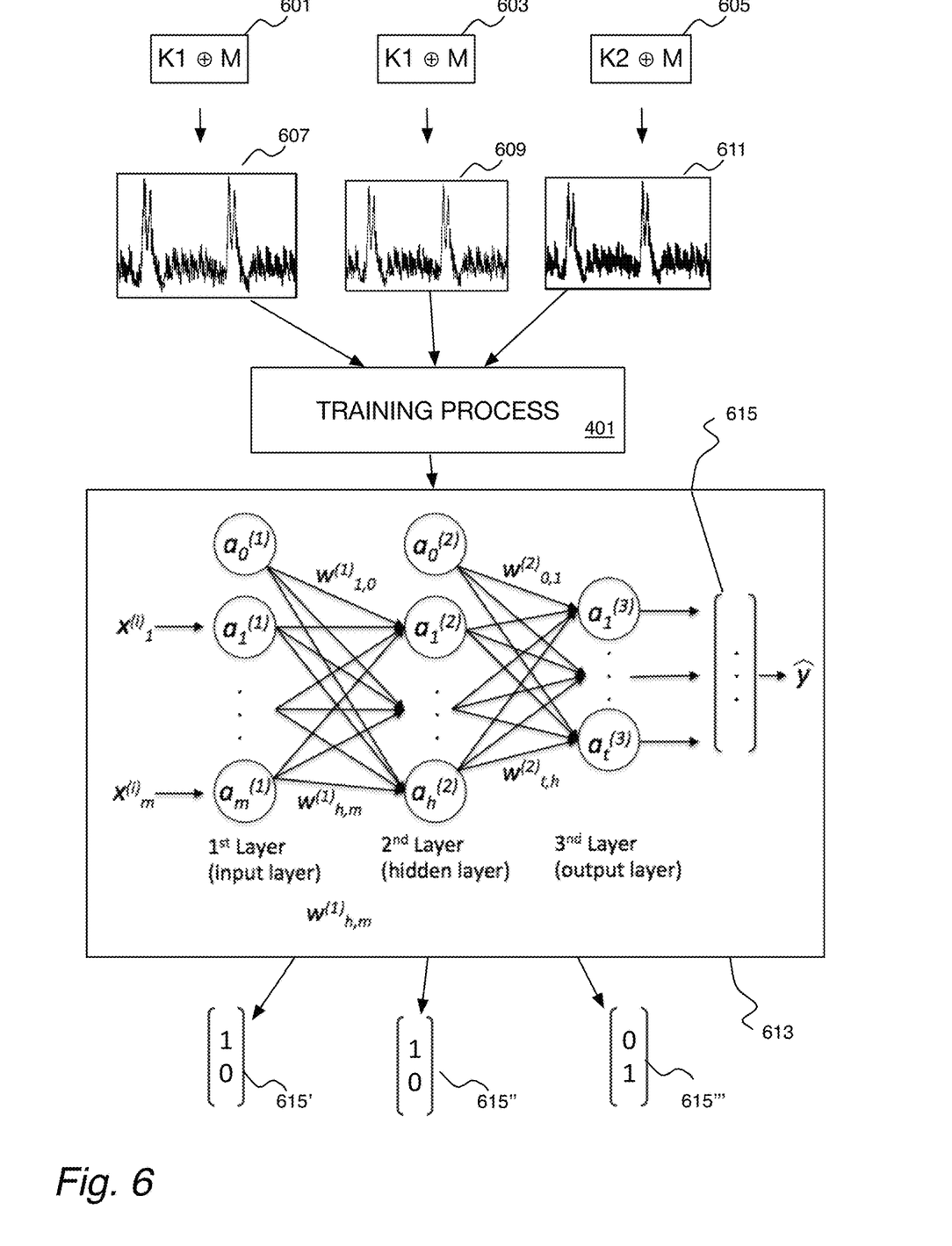
FIG. 6 is a schematic illustration of the process of FIG. 5.

FIG. 6 is a schematic illustration of the process 401 of FIG. 5. In this very simplified example, two pieces of sensitive information are applied to a message M; K1 is applied twice 601 and 603 and K2 is applied once 605. In a real-life example, many keys and many runs would be used to produce a training data set of thousands of records. For each of the runs, a data trace 607, 609, 611 is collected. Thus, producing a training data set including record for each key value and a corresponding trace.

The training process 401 produces parameters for an attack neural network 613.

The output from a neural network is a probability vector 615 which indicates for a given input trace value, the probability of a corresponding sensitive information value. Thus, if for example the trace 607 is supplied as input to the attack neural network 613, the output vector 615' would indicate a 1.0 probability that the sensitive information value is K1 and 0.0 that the sensitive information value is K2, whereas if the trace 611 is provided as input, the probability vector 615''' indicates a probability of 1.0 that the sensitive information value is K2 and a probability of 0.0 that the sensitive information value is K1.

Figure 7:
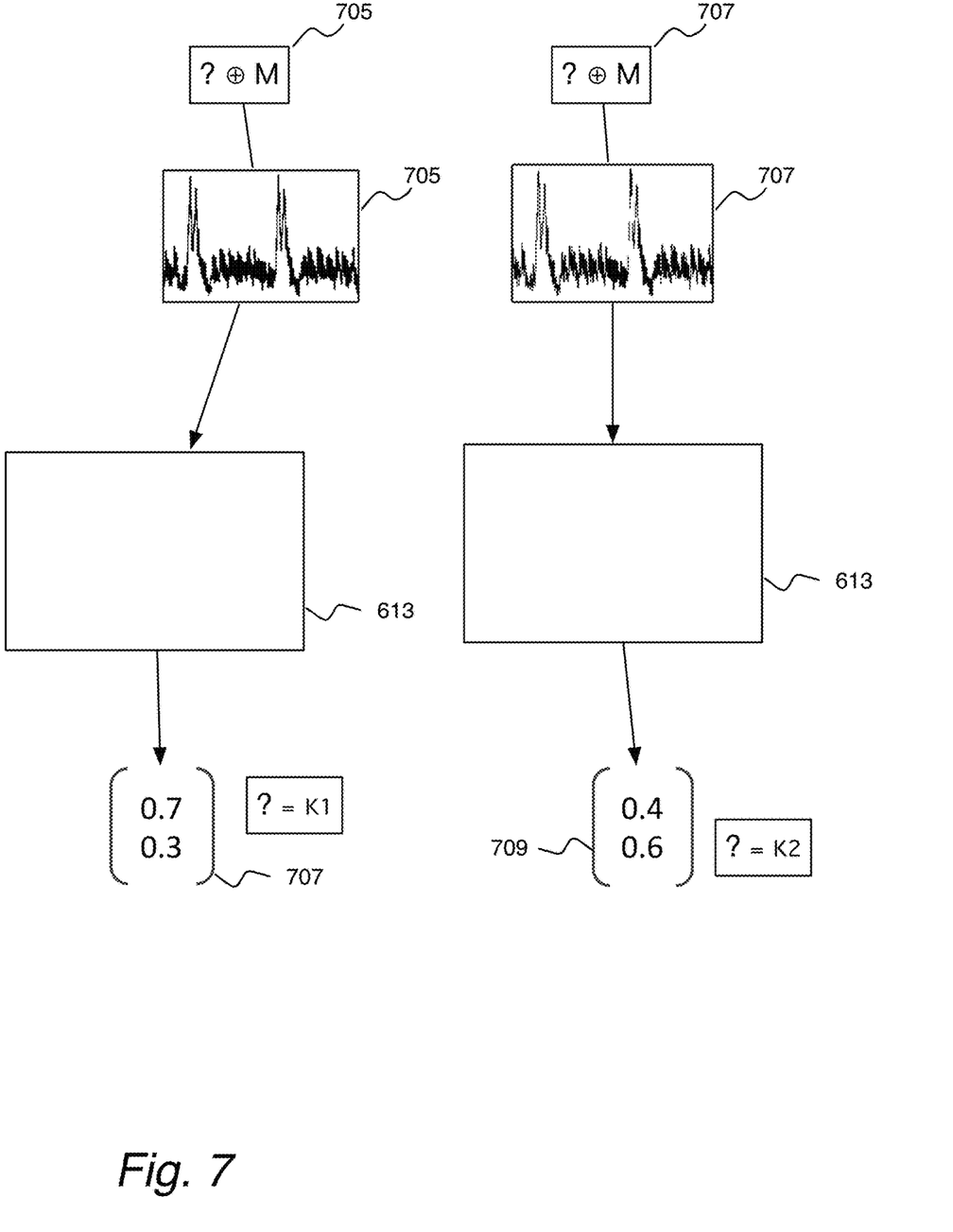
FIG. 7 illustrates the application of the attack neural network of FIG. 5 to two traces, respectively.

FIG. 7 illustrates the application of the attack neural network 613 to two traces 701 and 703, respectively, without knowing the key that was used to process the message M, steps 705 and 707, respectively. Application of the attack neural network 613 to the first trace 705 produces a probability vector 707 indication with a probability of 0.7 that the unknown key has the value K1 whereas application of the attack neural network 613 to the second trace indicates 709 a probability that the unknown key has the value K2.

Figure 8:
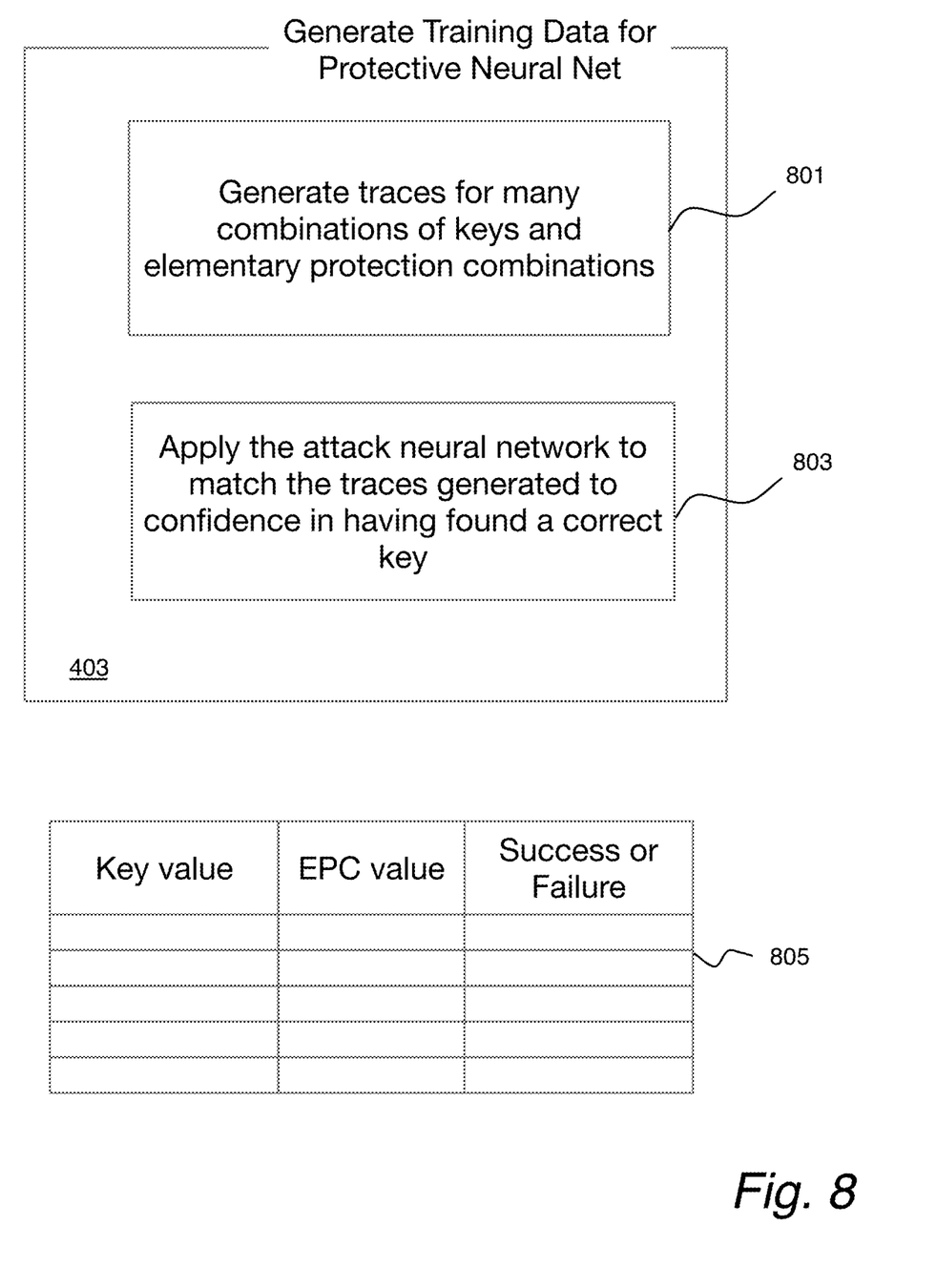
FIG. 8 is a flowchart illustrating the generation of training data for training the protective neural network of the flowchart of FIG. 4.

FIG. 8 is a flowchart illustrating step 403 of FIG. 4, the generation of training data for training the protective neural network 311.

Consider the illustration of the security device 301 of FIG. 3. In that example, there are eight elementary protection modules, EP_1 through EP_8. These may be applied singly or in combination. Thus, a convenient mechanism for indicating whether a particular module should be turned on or off while performing the sensitive operation 323 is to associate each elementary protection with a bit in a vector 335 of bits that indicate whether to turn off or on each of the elementary protections. For example, if the first bit and third bit are ON, EP_1 and EP_3 should be executed. Thus, the output from the protective neural network 311 is an indication of how to set the bits of the EPC vector 335. Accordingly, the training mechanism executes a variety of sensitive information data in combination with application of a variety of elementary protections to determine predictions of the sensitive information using the attack neural network 613. The resulting data which is a classification of sensitive information value, EPC value, and the produced probability vector from the attack neural network 613. Low confidence in predictions from the attack neural network 613 is indicative of success from the applied countermeasures whereas high confidence in the predictions from the attack neural network 613 is indicative of low success from the applied countermeasures.

Generating training data for the protective neural network 311 is a two-step process. First, traces are generated for many combinations of sensitive information and elementary protections, step 801. Second, the attack neural network 613 is used to match the sensitive information input and the elementary protection combinations applied to the level of success in preventing the attack neural network 613 from revealing the sensitive information, step 803, resulting in a data set 805 having the fields sensitive information value (e.g., key value), elementary protection combination, and success or failure.

Figure 9:
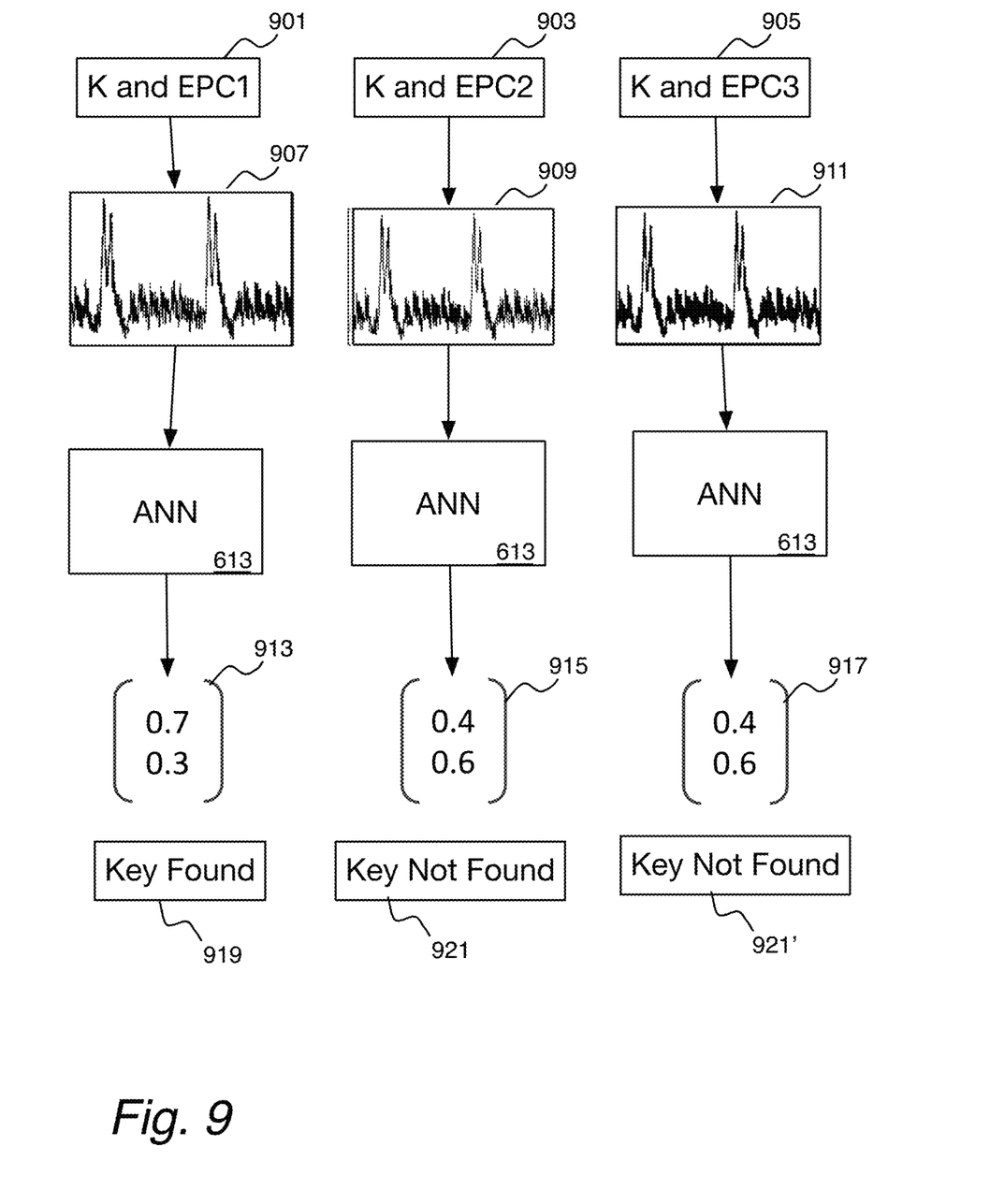
FIG. 9 is an illustration of the generation of training data for one value for the sensitive information K being protected for training the protective neural network.

FIG. 9 is an illustration of the generation of training data for one value for the sensitive information K being protected for training the protective neural network. Three elementary protection combinations are tested together with that sensitive information value, EPC1 901, EPC2 903, and EPC3 905, and for each combination, a trace 907, 909, 911 is generated and saved. The traces 907 are matched using the attack neural network in attempts to discover the corresponding sensitive information value e;g key. As described hereinabove, the output is a probability vector 913, 915, 917, respectively. In this example, for the first combination, the output vector 913 reveals that there is a high confidence that the sensitive information (key) has been found. Thus, in that instance the elementary protection combination EPC1 was a poor choice as the sensitive information (key) was found 919. On the other hand, for EPC2 and EPC3, the selected elementary protection combinations resulted in good protection for the sensitive information as the sensitive information value eg key was not found 921, 921'.

After repeating execution of the sensitive operation 323 with many different values for the sensitive information 325 and elementary protection combinations (EPC), a large data set of traces is generated. These sensitive information values, EPC values, and traces can then be matched using the attack neural network to produce an output set having many entries for sensitive information value, EPC value, and success or failure of the protection.

A neural network training algorithm is applied using the generated training data set 805 to determine parameter values 309 for the protective neural network 311 to enable it to match sensitive information value to a corresponding EPC value representing a combination of countermeasures most likely to protect the sensitive information from being divulged using the attack neural network, step 405.

Having programmed (step 407) the co-processor 303 with the parameters determine from the training data (step 405), the security device 301 may be deployed for its intended purpose, i.e., performing sensitive operations 323 (e.g., a cryptography) while protecting the privacy of the sensitive information 325 entrusted to it.

When the sensitive information 323 value is updated, the protective neural network 311 is executed to match the new sensitive information value 323 to a new EPC value. With the updated EPC value, a new combination of elementary protections are executed when the sensitive operation 323 is executed.

Alternatively, a security device 301 may hold in its possession multiple pieces of sensitive information, e.g., cryptographic keys or passwords associated with multiple accounts. In the process of retrieving and applying a particular key, the protective neural network 311 may be executed on that key so as to select an appropriate elementary protection combination.

From the foregoing it will be apparent that a security device that automatically selects a combination of elementary protection countermeasures based on the sensitive information being used in a sensitive operation is provided. For example, the mechanism may be used to select elementary protection countermeasures based on the cryptography key being used in a particular cryptographic operation or the password used to control access to an account.

The techniques described hereinabove are not limited in their applicability to security devices. Rather, discussion above is but one set of embodiments. Alternative embodiments apply the techniques to other types of sensitive operations, e.g., memory transfer of sensitive data, biometric data manipulations, PIN code and password operations.

Although specific embodiments of the invention have been described and illustrated, the invention is not to be limited to the specific forms or arrangements of parts so described and illustrated. The invention is limited only by the claims.

The invention claimed is:

1. A method for securing a security device against side-channel analysis attacks while performing a sensitive operation, the method comprising:
   training an attack neural network to perform a side-channel attack against the security device while performing a sensitive operation;
   creating a training data set for a protective neural network by applying a plurality of elementary protection combinations to the sensitive operation while performing the sensitive operation using a plurality of values for the piece of sensitive information, and for each elementary protection combination and sensitive information value, recording in the training data set whether the elementary protection combination prevented the attack neural network from discerning the sensitive information value;
   training a protective neural network executing on a coprocessor of the security device using the training data set for the protective neural network such that an input to the protective neural network is a sensitive information value to be protected and an output of the protective neural network is an indicator of which combination of elementary protections to apply to protect the piece of information from being detectable using the attack neural network thereby producing a set of parameters for the protective neural network; and
   programming the coprocessor of the security device with the set of parameters for the protective neural network.

2. The method of claim 1 for securing a security device against side-channel analysis attacks while performing a sensitive operation, wherein the step of training an attack neural network comprises:
   collecting side-channel data traces while performing the sensitive operation on the security device using a large set of values for the sensitive information value used to perform the sensitive operation wherein for a given input side-channel data trace the attack neural network produces a predicted value for the sensitive information.

3. The method of claim 1 for securing a security device against side-channel analysis attacks while performing a sensitive operation, the step of creating a training data set for the protective neural network comprises:
   collecting side-channel data traces while performing the sensitive operation on the security device using a large set of values for the piece of sensitive information used to perform the sensitive operation;
   applying the attack neural network to the collected side-channel data traces and recording for each collected data trace, whether the attack neural network successfully determined the sensitive information value associated with the data trace thereby producing a training data set with a record, for each combination of sensitive information value and elementary-protection combination, whether the elementary-protection combination successfully protected the sensitive information value from being determined by the attack neural network.

4. The method of claim 1 for securing a security device against side-channel analysis attacks while performing a sensitive operation, wherein programming the coprocessor of the security device comprises storing the set of parameters in a memory connected to the coprocessor.

5. The method of claim 1 for securing a security device against side-channel analysis attacks while performing a sensitive operation, wherein the piece of sensitive information is a cryptographic key.

6. The method of claim 1 for securing a security device against side-channel analysis attacks while performing a sensitive operation,
   wherein the sensitive operation is either a cryptographic operation selected from a set comprising encryption, decryption, digital signature, and authentication or an operation selected from a set comprising memory transfer of sensitive data, biometric data manipulations, PIN code or password operations.

7. The method of claim 1 for securing a security device against side-channel analysis attacks while performing a sensitive operation,
   wherein the combination of elementary protections comprises one or more elementary protections selected from software countermeasures comprising random interrupt, random memory cache flushing, random delay, dummy process, randomized execution order, masking with a random value, and hardware countermeasures comprising random interrupt, random memory cache flushing, activation of complementary computation, random delay, dummy clock cycle, power random noise insertion, power smoothing, jittering, clock randomization, bus encryption, randomized execution order, masking with a random value.

8. A system for programming a security device having a co-processor operable to execute a neural network, the system comprising:
   a computer connected to a device operable to produce side-channel data traces from an operation of a security device, the computer being programmed with instructions to:
      train an attack neural network to perform a side-channel attack against the security device while performing a sensitive operation;
      create a training data set for a protective neural network by applying a plurality of elementary protection combinations to the sensitive operation while performing the sensitive operation using a plurality of values for the piece of sensitive information and for each elementary protection combination and sensitive information value, recording in the training data set whether the elementary protection combination prevented the attack neural network from discerning the sensitive information value;
      train a protective neural network executing on the coprocessor of the security device using the training data set for the protective neural network such that an input to the protective neural network is a sensitive information value to be protected and an output of the protective neural network is an indicator of which combination of elementary protections to apply to protect the piece of information from being detectable using the attack neural network thereby producing a set of parameters for the protective neural network; and program the coprocessor of the security device with the set of parameters for the protective neural network.

* * * * *